No. 770,629. PATENTED SEPT. 20, 1904.
W. A. DEJARNATT.
PROTECTOR FOR EGGS FOR BROODING PURPOSES.
APPLICATION FILED MAR. 16, 1904.
NO MODEL.
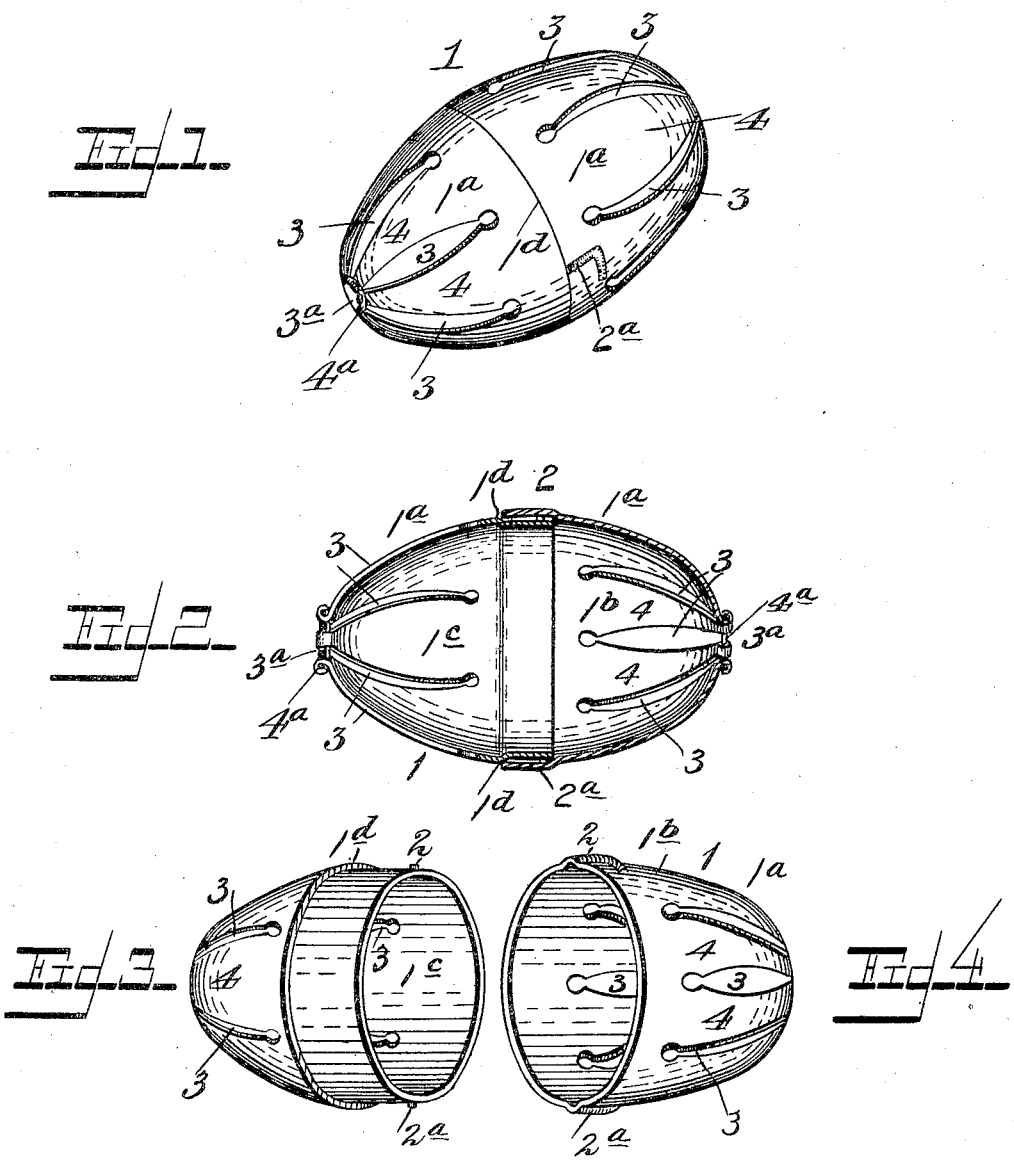
Witnesses:
Inventor:
Winifred A. Dejarnatt,
By Louis Bagger & Co.,
Attorneys.

No. 770,629.

Patented September 20, 1904.

UNITED STATES PATENT OFFICE.

WINIFRED A. DEJARNATT, OF AUDRAIN COUNTY, MISSOURI.

PROTECTOR FOR EGGS FOR BROODING PURPOSES.

SPECIFICATION forming part of Letters Patent No. 770,629, dated September 20, 1904.

Application filed March 16, 1904. Serial No. 198,463. (No model.)

*To all whom it may concern:*

Be it known that I, WINIFRED A. DEJARNATT, a citizen of the United States, residing in the county of Audrain, State of Missouri, have invented certain new and useful Improvements in Protectors for Eggs for Brooding Purposes, of which the following is a specification.

My invention relates to improvements in what may be termed "protectors" for eggs for brooding purposes.

Said invention has mainly for its object to inclose the eggs covered by a hen of the fowl class, as in hatching the young, to prevent the liability of the crushing of the eggs and chickens, either before or after having been "pipped."

Said invention consists of certain structural features thereof, substantially as hereinafter more fully disclosed, and particularly pointed out by the claims.

In the accompanying drawings, illustrating the preferred embodiment of my invention, Figure 1 is a perspective view thereof. Fig. 2 is a longitudinal section of the same. Figs. 3 and 4 are views showing the constituent members or parts of the invention disassociated.

In the practicing of my invention I form or construct a casing or closure suitable for inclosing or enveloping an egg—for instance, eggs which may become more or less crushed during the "pipping" period—to insure immunity from accident to the young until delivery from the shell or an egg which may have been slightly crushed during the setting period to protect the same until the young has been hatched, or it may be used to protect eggs throughout the hatching period. Said closure or casing consists of two sections or members $1^a$, joined or united about at what constitutes the transverse center of said casing, with their inner annular portions $1^b$ $1^c$ lapping one upon the other, the underlapping portion $1^c$ being of the requisite reduced diameter for that purpose and having an annular shoulder or stop $1^d$ engaged by the opposite edge of the overlapping portion $1^b$ as it is placed in position thereon. Said annular lapping portions have at opposite lateral points thereon, preferably, bayonet-joint form of fastenings 2 $2^a$ for the effective retention of the closure-sections in place, the construction of which is well known, and therefore needs no detailed description herein. Said closure-sections are formed, preferably, with numerous perforations or openings 3 $3^a$ laterally and in their ends to provide for ventilation and the passage of animal heat, which perforations or openings may be annular or circular, oblong or rectangular, or of other preferred outline. The shell or wall of each closure-section—preferably produced in the present instance of malleable metal—may, if desired, be of celluloid or other readily-manipulated material suitable for the purpose.

Latitude is allowed as to details herein, as they may be changed as circumstances suggest without departing from the spirit of my invention and the latter still be protected.

I claim—

1. A device of the character described, consisting of two conical sections conjointly constituting a closure or receptacle conforming to, and adapted to incase, an egg, one section having an annular underlapping portion encompassed by the corresponding overlapping portion of the other section, the former section having an annular shoulder forming an abutment for the annular edge of the latter section, whereby said sections are brought together with their outer surfaces flush with each other said sections also having openings therethrough for the passage of animal heat and for ventilation.

2. A closure or casing of the character described, consisting of two substantial conical sections, with one of their meeting annular portions formed with a reduced diameter underlapping the other annular portion, and with an annular shoulder engaged by the edge of the other annular portion and with their outer surfaces standing flush at their point of union, said annular portions also having interlocking fastenings, and each of said sections being produced with numerous openings or perforations for ventilating purposes, as set forth.

In testimony whereof I have signed my name to this specification in presence of two witnesses.

WINIFRED A. DEJARNATT.

Witnesses:
J. D. PULIS,
HALE W. DE JARNATT.